US008896676B2

(12) United States Patent
Hong

(10) Patent No.: US 8,896,676 B2
(45) Date of Patent: Nov. 25, 2014

(54) METHOD AND SYSTEM FOR DETERMINING TRANSMITTANCE INTERVALS IN 3D SHUTTER EYEWEAR BASED ON DISPLAY PANEL RESPONSE TIME

(75) Inventor: Sunkwang Hong, Doylestown, PA (US)

(73) Assignee: Broadcom Corporation, Irvine, CA (US)

( * ) Notice: Subject to any disclaimer, the term of this patent is extended or adjusted under 35 U.S.C. 154(b) by 417 days.

(21) Appl. No.: 12/876,789

(22) Filed: Sep. 7, 2010

(65) Prior Publication Data

US 2011/0122237 A1 May 26, 2011

Related U.S. Application Data

(60) Provisional application No. 61/281,893, filed on Nov. 20, 2009, provisional application No. 61/313,489, filed on Mar. 12, 2010.

(51) Int. Cl.
*H04N 13/04* (2006.01)
*H04N 9/47* (2006.01)
*H04N 13/00* (2006.01)

(52) U.S. Cl.
CPC ....... *H04N 13/0438* (2013.01); *H04N 13/0497* (2013.01); *H04N 2213/008* (2013.01)
USPC ................... 348/56; 348/43; 348/51; 348/53; 348/55; 345/501

(58) Field of Classification Search
USPC ..................................................... 348/40–175
See application file for complete search history.

(56) References Cited

U.S. PATENT DOCUMENTS

| 6,456,432 | B1 * | 9/2002 | Lazzaro et al. | 359/464 |
|---|---|---|---|---|
| 8,077,180 | B1 * | 12/2011 | Tremblay | 345/501 |
| 8,303,112 | B2 * | 11/2012 | Jacobs et al. | 359/15 |
| 2005/0077450 | A1 * | 4/2005 | Baer | 250/208.1 |
| 2007/0147827 | A1 * | 6/2007 | Sheynman et al. | 396/325 |
| 2007/0195408 | A1 * | 8/2007 | Divelbiss et al. | 359/462 |
| 2008/0284801 | A1 * | 11/2008 | Brigham et al. | 345/690 |
| 2008/0291863 | A1 * | 11/2008 | Agren | 370/315 |
| 2008/0291891 | A1 * | 11/2008 | Jerlhagen et al. | 370/350 |
| 2008/0303963 | A1 * | 12/2008 | Jung et al. | 349/13 |

(Continued)

OTHER PUBLICATIONS

Specification of the Bluetooth Standard, Nov. 4, 2004.*

*Primary Examiner* — Joseph Ustaris
*Assistant Examiner* — Talha Nawaz
(74) *Attorney, Agent, or Firm* — Foley & Lardner LLP; Christopher J. McKenna; Angela D. Murch

(57) ABSTRACT

A 3D video viewing shutter device receives display response time from a 3D video display device for determining shutter open and close times. Response time may correspond to display type, a particular display and/or a change in pixel illumination levels between frames. The shutter device receives response information during device initialization and/or corresponding to changing pixel illumination levels. A sequence of 3D frames may comprise a pattern of left frames, right frames, blank frames and/or frames comprising a combination of left and right frames. Based on display device and/or shutter device response times, the shutter device may extend shutter transmittance time during a frame display interval into a blank frame interval. Transmittance may be enabled during display of blank frames subsequent to left or right frames. The shutter device and display device may communicate via a wireless link for example, via a Bluetooth wireless link utilizing Bluetooth clocks.

20 Claims, 7 Drawing Sheets

(56) References Cited

U.S. PATENT DOCUMENTS

| | | |
|---|---|---|
| 2010/0194857 A1* | 8/2010 | Mentz et al. .................... 348/43 |
| 2010/0201812 A1* | 8/2010 | McGibney et al. ........... 348/143 |
| 2010/0238274 A1* | 9/2010 | Kim et al. ...................... 348/51 |
| 2010/0289883 A1* | 11/2010 | Goris et al. .................... 348/56 |
| 2011/0001808 A1* | 1/2011 | Mentz et al. .................... 348/59 |
| 2011/0025821 A1* | 2/2011 | Curtis et al. .................... 348/43 |
| 2011/0090324 A1* | 4/2011 | Mentz et al. .................... 348/55 |
| 2011/0096146 A1* | 4/2011 | Hulyalkar et al. .............. 348/43 |
| 2011/0205344 A1* | 8/2011 | Lee ................................. 348/56 |
| 2011/0292191 A1* | 12/2011 | MacNaughton et al. ....... 348/56 |
| 2012/0194660 A1* | 8/2012 | Nakamura et al. ............. 348/56 |
| 2012/0257027 A1* | 10/2012 | Kawahara ....................... 348/56 |
| 2013/0038688 A1* | 2/2013 | Jacobs et al. ................... 348/43 |

\* cited by examiner

US 8,896,676 B2

METHOD AND SYSTEM FOR DETERMINING TRANSMITTANCE INTERVALS IN 3D SHUTTER EYEWEAR BASED ON DISPLAY PANEL RESPONSE TIME

CROSS-REFERENCE TO RELATED APPLICATIONS/INCORPORATION BY REFERENCE

This application also makes reference to:
U.S. Patent Application Ser. No. 61/281,893 which was filed on Nov. 20, 2009;
U.S. Patent Application Ser. No. 61/313,489 which was filed on Mar. 12, 2010; and
U.S. patent application Ser. No. 12/605,039 which was filed on Oct. 23, 2009 and issued as U.S. Pat. No. 8,300,087 on Oct. 30, 2012.

Each of the above stated applications is hereby incorporated herein by reference in its entirety.

FIELD OF THE INVENTION

Certain embodiments of the invention relate to communication systems. More specifically, certain embodiments of the invention relate to synchronizing 3D shutter eyewear to a television refresh rate.

BACKGROUND OF THE INVENTION

Digital video capabilities may be incorporated into a wide range of devices such as, for example, digital televisions, digital direct broadcast systems, computer systems, digital recording devices, gaming consoles and the like. Digital video devices may provide significant improvements over conventional analog video systems in processing and transmitting video sequences with increased bandwidth efficiency.

Video content may be recorded in two-dimensional (3D) format or in three-dimensional (3D) format. In various applications such as, for example, DVD movies and digital TV, a 3D video is often desirable because it is often more realistic to viewers than the 3D counterpart. A 3D video comprises left view frames and right view frames. 3D eyewear, which may be referred to as glasses, may be utilized for viewing 3D video content. Exemplary 3D eyewear may utilize polarizing technology or shutter techniques, for example.

In order to produce images which can be viewed by consumers with a 3-dimensional (3D) effect, videos are often filmed or rendered stereoscopically. For example, a stream of images may be produced for viewing with the right eye and another stream of images may be produced for viewing with the left eye. The images are typically taken such that one of the image streams is taken from a perspective which is slightly offset from the other, in the same way that the perspective seen by the right eye is slightly offset from the left eye.

Various display systems for 3D video, such as televisions and projectors for film or video, display a stream of images in sequence at a rate known as the refresh rate. One popular system for reproducing these 3D videos involves displaying left and right images at twice the normal refresh rate of non-3D video, alternating images for the left and right eyes. A viewer may wear eyewear which may comprise LCD shutters and/or non-LCD shutters, for example, that are electronically controlled such that the left eye shutter is open when an image for the left eye is being displayed, and the right eye shutter is open when an image for the right eye is being displayed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for determining transmittance intervals in 3D shutter eyewear based on display panel response time.

Various advantages, aspects and novel features of the present invention, as well as details of an illustrated embodiment thereof, will be more fully understood from the following description and drawings.

DETAILED DESCRIPTION OF THE INVENTION

Figure 1A:
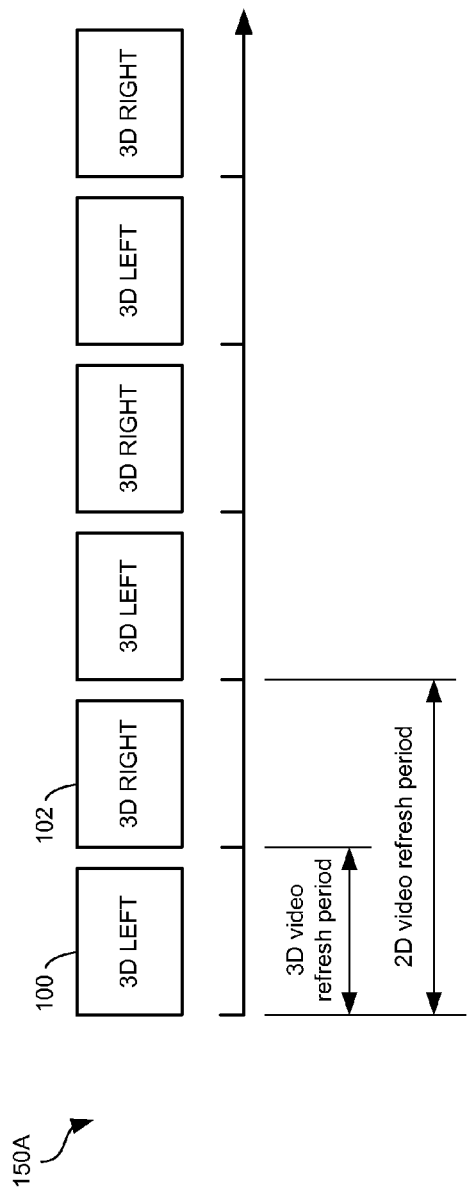
FIG. 1A is a diagram that illustrates an exemplary sequence of left and right 3D video frames, in accordance with an embodiment of the invention.

Certain embodiments of the invention can be found in a method and system for transmittance intervals in 3D shutter eyewear based on display panel response time. In accordance with various embodiments of the invention, a 3D video viewing shutter device that is communicatively coupled to a 3D video display device may receive information from the 3D video display device that is based on response time for display of 3D frames by the 3D video display device. The 3D video viewing shutter device may determine time instants that correspond to, when to open and when to close its left and right shutters based on the received response time information. In various embodiments of the invention, the time instants may be received from the 3D video display device. The 3D video viewing shutter device may open and close its left and right shutters based on the determined time instants. The received response time information may be based on a response time for a type of display utilized in the 3D video display device. Moreover, the received response time information may be based on a response time for a particular display utilized in the 3D video display device. In various embodiments of the invention, the received response time information may be based on a response time for a change in pixel illumination levels between display of two video frames and/or between display of video frame sequences. The 3D video viewing shutter device may receive the information from the 3D video display device that is based on the response time for initialization of the 3D video viewing shutter device. The 3D video viewing shutter device may receive the information when one or more frames comprising a lower level of pixel illumination is followed by one or more frames comprising a higher level of pixel illumination. Furthermore, the 3D video viewing shutter device may receive the information when one or more frames comprising a higher level of pixel illumination is followed by one or more frames comprising a lower level of pixel illumination. The 3D frames may comprise a pattern. The pattern may comprise two or more of left frames, right frames, blank frames and frames that comprise a combination and/or blend of left and right frame data. The 3D video viewing shutter device may extend a left shutter transmittance time from a display time for a left frame into display time of one or more subsequent blank frames. Similarly, the 3D video viewing shutter device may extend a right shutter transmittance time from a display time of a right frame into a display time of one or more blank frames. The extension of shutter transmittance time may be based on one or both of the response time for display of 3D frames by the 3D video display device and a response time associated with said 3D video viewing shutter device. The 3D video viewing shutter device may enable transmittance by a left shutter during display time of one or more blank frames that is subsequent to display time of a left 3D frame. The 3D video viewing shutter device may enable transmittance of a right shutter during display time of one or more blank frames that is subsequent to display time of a right 3D frame. The enabled transmittance may be based on one or both of the response time for display of 3D frames by the 3D video display device and a response time associated with the 3D video viewing shutter device. The 3D video viewing shutter device may communicate with the 3D video display device via a wireless link. For example, the 3D video viewing shutter device may communicate with the 3D video display device via a Bluetooth wireless link utilizing Bluetooth clocks. In this manner, transmittance intervals in 3D shutter eyewear may be determined based on display panel response time and/or 3D shutter eyewear response times.

FIG. 1A is a diagram that illustrates an exemplary sequence of left and right 3D video frames, in accordance with an embodiment of the invention. Referring to FIG. 1A, there is shown a sequence of left view and right view 3D video frames 150A that comprises a left view frame 100 and a right view frame 102.

The sequence of left view and right view 3D video frames 150A may comprise stereoscopic video and/or graphics images. The left view frame 100 and the right view frame 102 may comprise images of the same subject matter that are seen from slightly different angles and when viewed sequentially, may create an illusion of a three dimensional image. Left view frames and right view frames may be referred to as left frames and right frames.

Figure 3A:
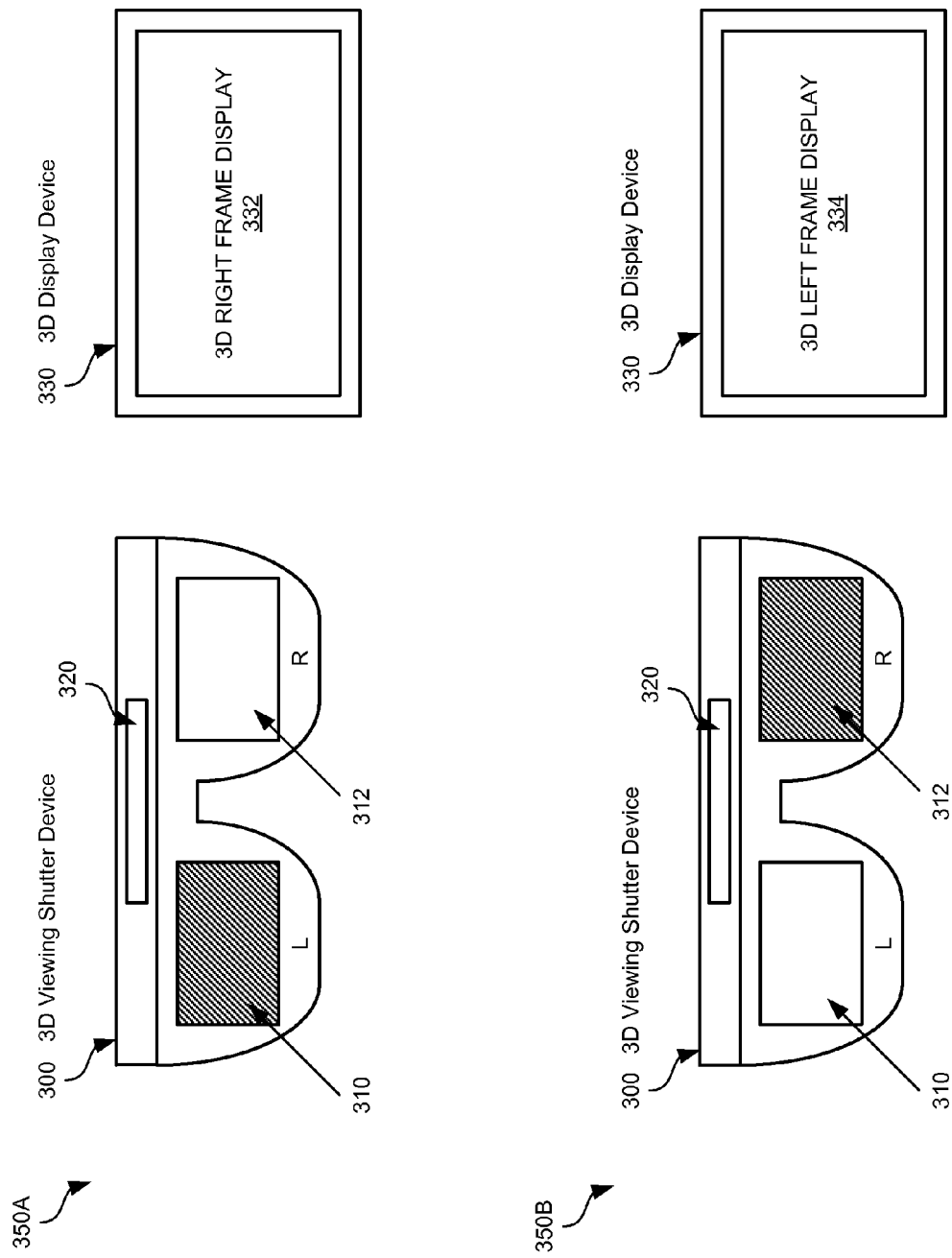
FIG. 3A is a diagram that illustrates exemplary synchronization of left and right shutters in a 3D viewing device with left view and right view 3D frames that are displayed on a 3D video display device, in accordance with an embodiment of the invention.

In operation, the sequence of left view and right view 3D video frames 150A may be displayed on a 3D video display device (shown in FIG. 3A). The left view frame 100 is generated for viewing with a left eye and the right view frame 102 is generated for viewing with a right eye. When 3D videos are displayed in this manner, a viewer may utilize a 3D viewing device, for example 3D eyewear (shown in FIG. 3A). The 3D eyewear may utilize a shuttering technique that may block vision in one eye while enabling vision in the other eye. This may be referred to as opening a shutter or closing a shutter. A viewing device that utilizes a shuttering technique may be referred to as 3D shutter eyewear. Shuttering may be electronically controlled such that the left eye shutter is open only when an image for the left eye is being displayed on a display device, and the right eye shutter is open only when an image for the right eye is being displayed on the display device. When a shutter is closed, the image being displayed on the display is substantially blocked by the shutter. In various embodiments of the invention, the shutters may be made using liquid crystal (LC) and such shutters are typically referred to as LC shutters. The shutters may also be made utilizing non-LC technology. The time interval over which a shutter opens and/or closes may be referred to as shutter response time.

The sequence of left view and right view 3D video frames 150A may be written to a video display and a time interval needed for illuminating pixels of the display, for one frame of the sequence, may be referred to as display response time. The display response time may vary depending on, for example, the display technology utilized and/or a level of change in illumination between frames in the sequence of left view and right view 3D video frames 150A. For example, response time may be greater for a pixel to change from black to white than to change from a middle level gray to white. In various embodiments of the invention, display response time information may be communicated from a 3D video display device to a 3D viewing shutter device. The 3D viewing shutter device may utilize the display response time and/or the shutter response time to determine when to open and/or close the left and right shutters.

Figure 1B:
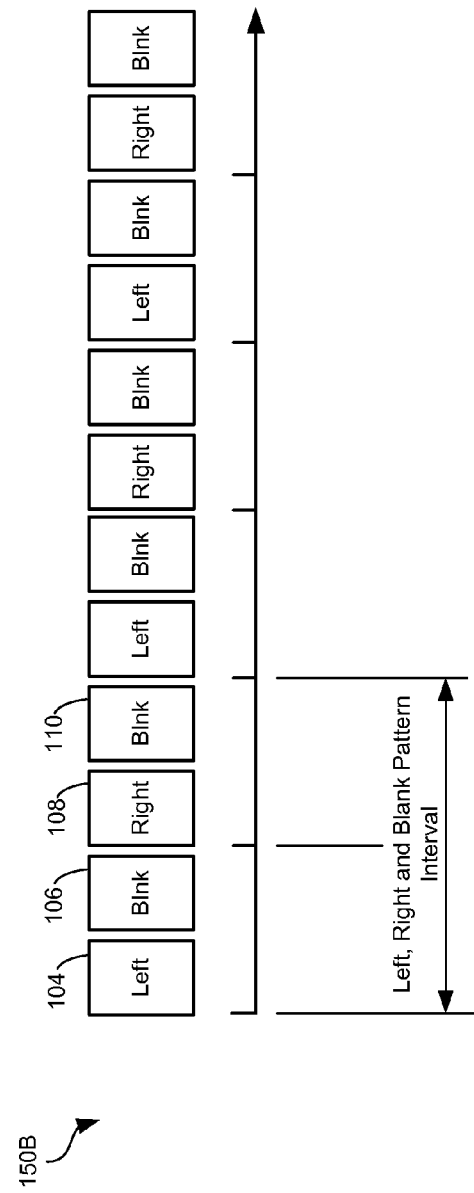
FIG. 1B is diagram that illustrates an exemplary sequence of left, right and blank 3D video frames, in accordance with an embodiment of the invention.

FIG. 1B is diagram that illustrates an exemplary sequence of left, right and blank 3D video frames, in accordance with an embodiment of the invention. Referring to FIG. 1B, there is shown a sequence comprising left view, right view and blank 3D video frames 150B that comprises a left view frame 104, a blank frame 106, a right view frame 108 and a blank frame 110.

The sequence comprising left view, right view and blank 3D video frames 150B may comprise stereoscopic video and/or graphics images as well as blank or black frames. The blank or black frames 106 and 110 may be utilized to reduce cross talk between left and right frames. For example, left and right 3D video frames may be displayed on a persistent display, such as, an LCD display, however, the invention is not limited in this regard. One frame of image data may be written to the display and corresponding pixels may be illuminated with the written content until another value is written over the first frame data. In instances when a screen may be partially illuminated with a left view frame and partially illuminated with a right view frame, a viewer may perceive crosstalk. One or more blank frames may be inserted between left and right frames, for example, in a pattern comprising left, right and blank frames, to compensate for display screen response time. In various embodiments of the invention, as the blank frame 106 is being written to the display, illumination of pixels in accordance with video data written for the left frame 104 may continue, for a certain response time. Information regarding the display response time may be communicated to a 3D viewing shutter device. The 3D viewing shutter device may utilize the display response time and/or the shutter response time to determine when to open and/or close the left and right shutters.

Figure 2A:
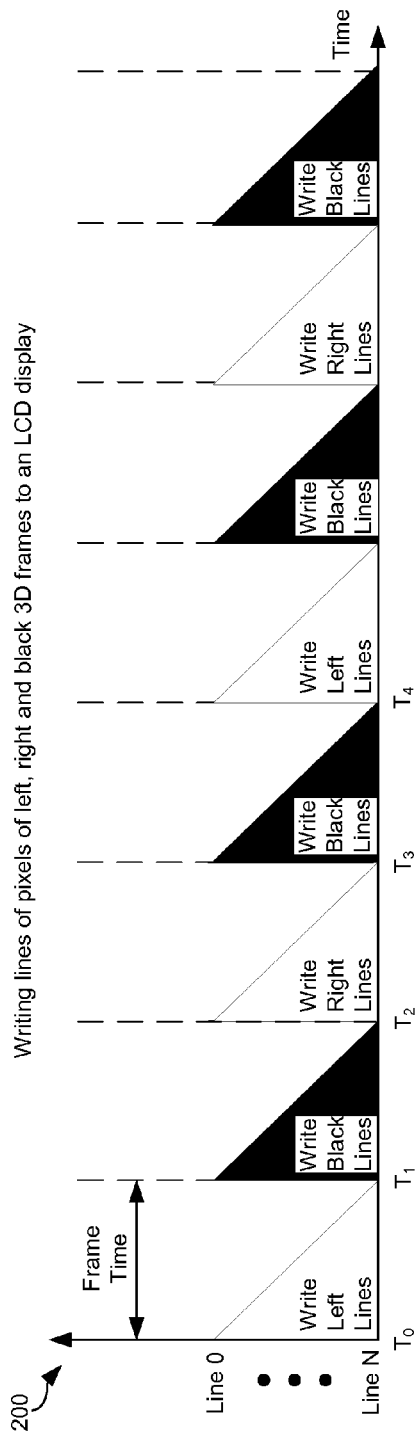
FIG. 2A is a block diagram that illustrates an exemplary sequence of 3D frames in a left, black, right, black pattern, which may be utilized in accordance with an embodiment of the invention.

FIG. 2A is a block diagram that illustrates an exemplary sequence of 3D frames in a left, black, right, black pattern, which may be utilized in accordance with an embodiment of the invention. Referring to FIG. 2A, there is shown a time line 200 comprising a left, black, right, black sequential frame display pattern.

The timeline 200 represents writing lines of pixel data for left frames, right frames and black frames to a persistent display device which may comprise, for example, an LCD display device. The left and right frames may comprise left and right 3D video and/or graphics content respectively. The black frames may comprise blanking frames, for example, black or low illumination pixels of single or multiple tone levels and may be referred to as black or blank frames. Moreover, in various embodiments of the invention, the black frames may comprise pixels of muted illumination that may comprise video and/or graphics content. The black frames may enable cross talk mitigation between left and right frames.

In an exemplary operation, between time instants T0 and T1, lines of a left frame comprising 3D video and/or graphics content may be written to an LCD display, for example. At time instant T1, the display may be illuminating with the left frame lines and the pixels may remain illuminated until they are written over with different illumination values. Also, between time instants T1 and T2, lines of black or muted frame pixel data may be written to the display. As the black lines are written, the left lines that have not yet been written over may remain illuminated. At time instant T2, the screen has been written to with black frame pixel data, however, due to liquid crystal response time relative to the refresh rate of the left, right and black frames, pixels that are written with black frame values, may still retain some level of vestige illumination from the left frame pixel data that was written between time instants T0 and T1. The vestige left frame illumination may remain on the LCD screen until the liquid crystal response time has lapsed. Between time instants T2 and T3, the right frame lines are written to the LCD screen. As the right frame lines are written to the screen, a portion of the screen may still be illuminated with the vestige left frame illumination where the liquid crystal response time has not lapsed and the pixel illumination has not yet reached the specified level for the black illumination. In this regard, a viewer utilizing shutter eyewear where the shutter eyewear are open for the right eye during the time interval from time instant T2 to time instant T3 may experience crosstalk from the vestigial left frame pixel illumination that was written during the interval between time instants T0 to T1.

In various embodiments of the invention, a different pattern of left, right and black frames may be written to the display. For example, a pattern comprising left, black, black, right, black, black may be utilized or, for example, three black frames may be written to the display between the right and left frames. Response times that may correspond to the time it takes for a left frame to illuminate, for a right frame to illuminate and/or for one or more black frames to reach a specified saturation level, may be communicated to shutter eyewear for use in controlling opening and closing left and right shutters in coordination with pixel illumination.

Figure 2B:
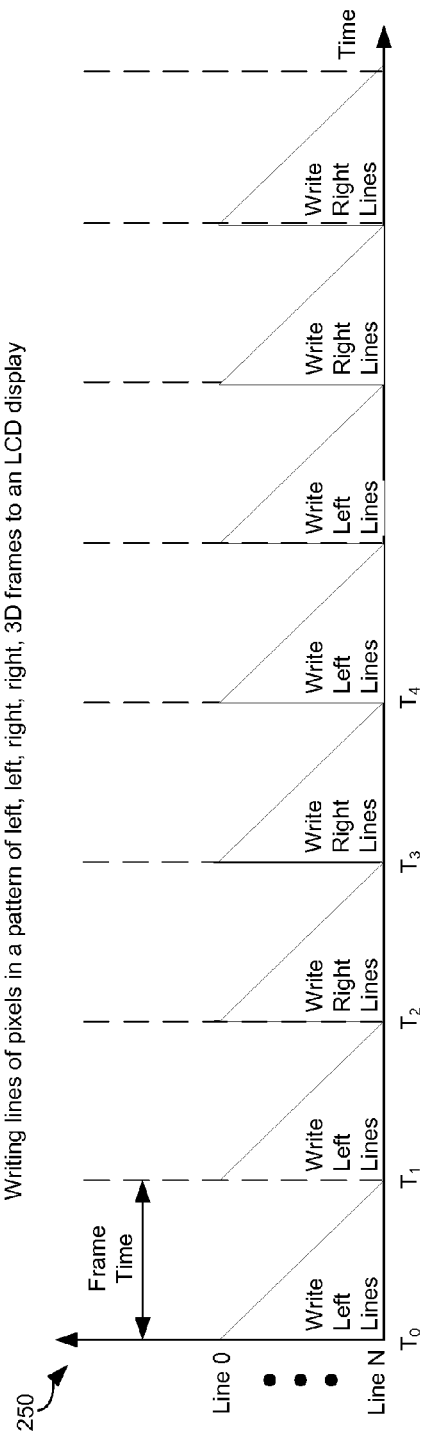
FIG. 2B is a block diagram that illustrates an exemplary sequence of 3D frames in a left, left, right, right pattern, which may be utilized in accordance with an embodiment of the invention.

FIG. 2B is a block diagram that illustrates an exemplary sequence of 3D frames in a left, left, right, right pattern, which may be utilized in accordance with an embodiment of the invention. Referring to FIG. 2B, there is shown a time line 250 comprising a left, left, right, right sequential frame display pattern.

The timeline 250 is similar to the timeline 200 in that it represents writing lines of pixel data for left frames and right frames to a persistent display device which may comprise an LCD display device. The timeline 250 may comprise a plurality of contiguous left frames in sequence with a plurality of contiguous right frames. The invention is not limited with regard to the number of contiguous left and/or right frames and any suitable combination may be utilized. Pixel values, for example, illumination levels, may be the same or different in contiguous left frames and/or contiguous right frames. For example, the second frame of a pair of contiguous left and/or right frames may be muted relative to the first frame. Notwithstanding, the invention is not limited in this regard and any suitable relative pixel illumination levels may be utilized for contiguous left and/or right frames. Utilizing contiguous left and/or right frames may enable cross talk mitigation between left and right frames.

In another exemplary embodiment of the invention, left and right frames may be blended or a frame may comprise some combination of information from a left frame and information from a right frame. For example, the left, left, right, right pattern shown in FIG. 2B may comprise a first frame with left frame pixel data, a second frame with a combination of left and right frame pixel data, a third frame with right frame pixel data and a fourth frame with a combination of right and left frame pixel data.

In an exemplary operation, between time instants T0 and T1, lines of a first left frame may be written to an LCD display, for example. At time instant T1, the display may be illuminating the first left frame lines and the pixels may remain illuminated until they are written over with new illumination values. Also, between time instants T1 and T2, lines of a second left frame may be written to the display. The pixel illumination levels may or may not be altered with respect to the illumination levels of the first left frame. As the lines of the second left frame are written, the lines of the first left frame that have not yet been written over may remain illuminated. At time instant T2, the screen has been written to with the second left frame pixel data, however, due to liquid crystal response time relative to the refresh rate of the left and right frames, pixels that are written with the second left frame values, may still retain some level of vestige illumination from the first left frame pixel data that was written between time instants T0 and T1. The vestige first left frame illumination may remain on the LCD screen until the liquid crystal response time has lapsed. Between time instants T2 and T3, the first right frame lines are written to the LCD screen. As the first right frame lines are written to the screen, a portion of the screen may still be illuminated with the vestige second left frame illumination where the liquid crystal response time has not lapsed and the pixel illumination has not yet reached the specified level for the second left frame illumination. In this regard, a viewer utilizing shutter eyewear where the shutter eyewear are open for the right eye during the time interval from time instant T2 to time instant T3 may experience crosstalk from the vestigial second left frame pixel illumination that was written during the interval between time instants T0 to T1.

Figure 2C:
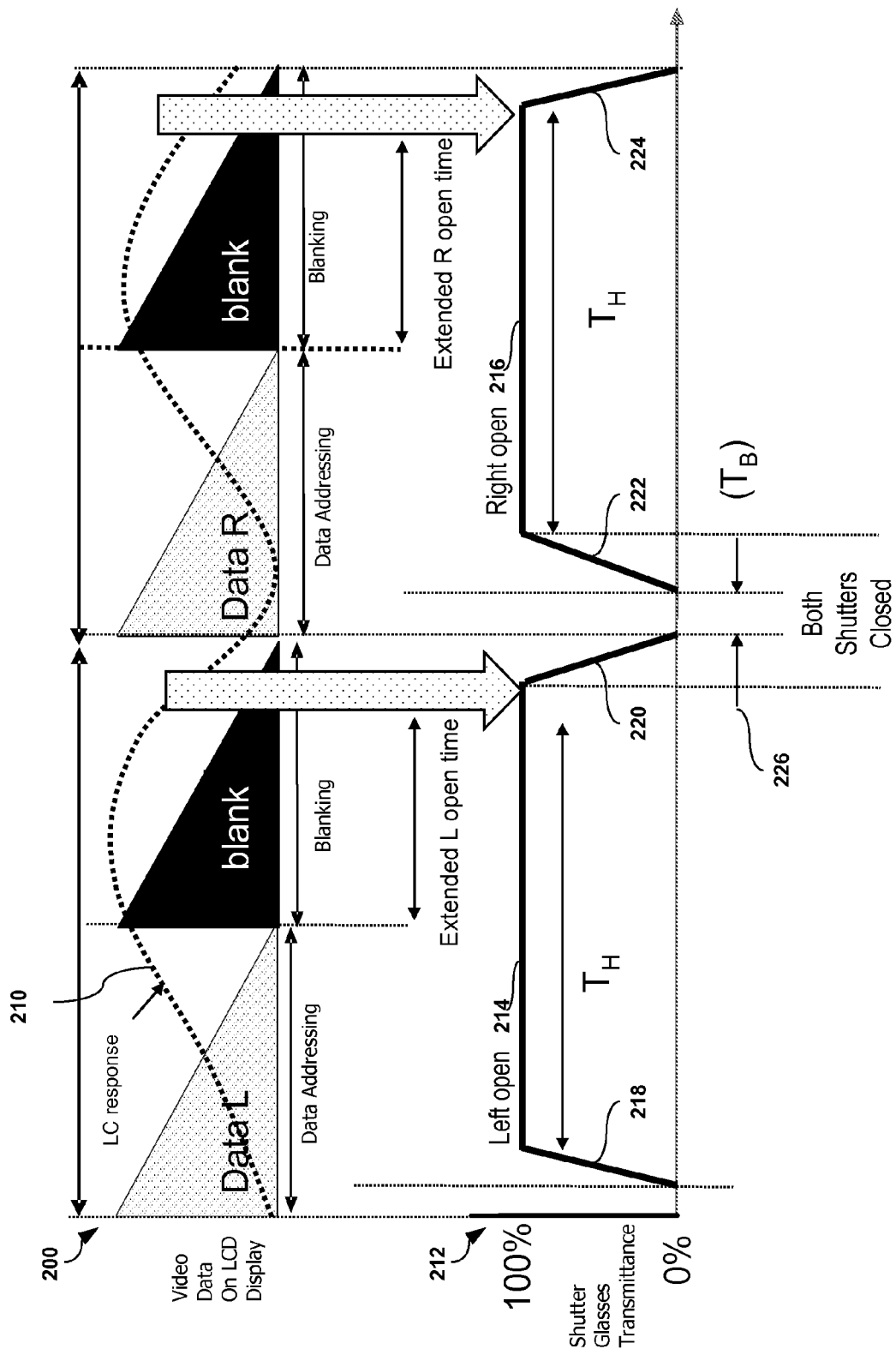
FIG. 2C is a block diagram that illustrates a response time line for illuminating left and right frame pixels in a persistent display device in relation to left and right shutter transmittance intervals, in accordance with an embodiment of the invention.

FIG. 2C is a block diagram that illustrates a response time line for illuminating left and right frame pixels in a persistent display device in relation to left and right shutter transmittance intervals, in accordance with an embodiment of the invention. Referring to FIG. 2C, there is shown the time line 200, which is described with respect to FIG. 2A, and which comprises a left, black, right, black sequential frame display pattern and also comprising a display response time line 210. In addition, there is shown, a shutter transmittance time line 212 that comprises a left shutter transmittance interval 214 and a right shutter transmittance interval 216. Also, there is shown, a left blocking to transmittance transition 218, a left transmittance to blocking transition 220, a right blocking to transmittance transition 222, a right transmittance to blocking transition 224 and a closed shutter interval 226.

The time line 250 from FIG. 2B may similarly be utilized to show a LCD display response time line for illuminating left and right frame pixels in relation to left and right shutter transmittance intervals.

The display response time line 210 represents pixel illumination over time in response to the sequence of left frame, blank frame, right frame, blank frame, video data that is written to a display for a pixel.

The shutter transmittance time line 212 represents "opening" and "closing" of shutters in a 3D viewing shutter device, for example, 3D shutter eyewear. During the left shutter transmittance interval 214 the viewing device may allow light to pass through to a user's left eye, for example, to enable a user to adequately perceive images from a video display device. During the right shutter transmittance interval 216 the viewing device may allow adequate light to pass through to a user's right eye. A shutter may be referred to as "open" when the shutter enables light transmittance and may be referred to as "closed" when light is blocked by the shutter.

The left blocking to transmittance transition 218 may represent the response time for the viewing device to "open" the left shutter. The left transmittance to blocking transition 220 may represent the response time for the viewing device to "close" the left shutter. The right blocking to transmittance transition 222 may represent the response time to "open" the right shutter and the right transmittance to blocking transition 224 may represent the response time needed to close the right shutter.

The closed shutter interval 226 may represent an interval when both left and right shutters a closed. By adjusting the closed shutter interval 226 and the left shutter transmittance interval 214 and the right shutter transmittance interval 216 cross talk between the left and right frames in a 3D video sequence may be reduced and/or minimized.

In operation, a user may view a sequence of 3D video frames represented in the time line 200, from a 3D video display device, utilizing a 3D viewing shutter device such as 3D shutter eyewear. The 3D video display device may communicate to the 3D viewing shutter device, information regarding timing of the sequence of 3D video frames and may communicate information regarding the display response time that is represented by the display response time line 210, for example. The 3D viewing shutter device may receive the display timing and/or response time and may utilize the received information to determine when to open and/or close the left and/or right shutters. In addition, one or more of the left blocking to transmittance transition 218, the left transmittance to blocking transition 220, the right blocking to transmittance transition 222 and the right transmittance to blocking transition 224 may be utilized to determine when to open and/or when to close the left and right shutters.

In an exemplary embodiment of the invention, the video sequence comprising a pattern of left, blank, right, blank frames as shown in the time line 200, may be displayed at a rate of 240 Hz. In this regard, an interval comprising a left frame and a blank frame may comprise a duration of 1/120 or approximately 8.3 ms. Moreover, the 8.3 ms interval may be equal to the sum of the left blocking to transmittance transition 218, the left shutter transmittance interval 214, the left transmittance to blocking transition 220 and the closed shutter interval 226. The left shutter transmittance interval 214 and/or the closed shutter interval 226 may be programmable in the 3D viewing shutter device, based on signaling from the 3D video display device. Because of slow display response, shown in the display response time line 210, the left shutter transmittance interval 214 may be extended into a blank frame write interval. In this regard, the left shutter transmittance interval 214 may be optimized based on the display response time line 210.

FIG. 3A is a diagram that illustrates exemplary synchronization of left and right shutters in a 3D viewing device with left view and right view 3D frames that are displayed on a 3D video display device, in accordance with an embodiment of the invention. Referring to FIG. 3A, there is shown a time instant 350A and a time instant 350B. In addition, there is shown a 3D viewing shutter device 300 that may comprise a left shutter 310 and a right shutter 312, and a shutter controller 320. Also shown is a 3D video display device 330, a displayed 3D right frame 332 and a displayed 3D left frame 334. The 3D viewing shutter device 300 and 3D video display device 330 are shown at time instant 350A and again at time instant 350B.

The 3D video display device 330 may comprise suitable logic, circuitry, interfaces and/or code that may be operable to display time sequential 3D video frames which may comprise left view frames, right view frames and/or blank frames such as, for example, the sequence of left view and right view 3D video frames 150A and the sequence comprising left view, right view and blank 3D video frames 150B. The left view frames, right view frames and/or blank frames may be referred to as left, right and/or blank frames. The invention is not limited to any specific type of 3D display device and may utilize any suitable 3D display device, for example, a persistent display device such as a liquid crystal display (LCD). Exemplary embodiments of the 3D video display device 330 may comprise a television, a computer monitor, a gaming device, a navigation device and/or a video projector, however, the invention is not limited in this regard. A viewer may utilize the 3D viewing shutter device 300 to perceive an illusion of 3D images in the 3D left view and right view frames. The 3D video display device 330 may be operable to communicate with the 3D viewing shutter device 300 to synchronize left and right shutters 310 and 312 with the display of left and right 3D frames 334 and 332. The 3D viewing shutter device 300 may comprise 3D shutter eyewear and may be referred to as the 3D shutter eyewear 300 or shutter eyewear, for example. In addition, the 3D viewing shutter device 300 may be referred to as the 3D video viewing shutter device.

In various embodiments of the invention, the 3D video display device 330 and the 3D viewing shutter device 300 may be operable to communicate via a wired or wireless connection, for example a Bluetooth or infrared (IR) connection, however, the invention is not limited with regard to any specific communication technology. Communication between the two devices may be synchronized. The 3D video display device 330 may be operable to communicate its refresh rate and/or a signal that may enable the 3D viewing shutter device to synchronize with the display of right and left frames, for example, a clock signal. In an exemplary embodiment of the invention, a Bluetooth clock may be utilized to synchronize right and left shutters in the 3D viewing shutter device 300 with the displayed right and left frames on the 3D video display device 330.

The 3D video display device 330 may comprise suitable logic, circuitry, interfaces and/or code that may be operable to determine when a left, right and/or blank 3D frames are being displayed and may be operable to generate a signal that indicates when 3D left frames, right frames and/or blank frames are displayed. The generated signal may be referred to as a display refresh signal. For example, a square wave may be generated that may measure as positive when a left frame is displayed and may measure as negative when a right frame is displayed. Notwithstanding, the invention is not limited in this regard, and any suitable display refresh signal or indicator of left, right and/or blank frame generation may be utilized. The 3D video display device 330 may record a time that is associated with a certain event in the display refresh signal or associated with a certain event that occurs when displaying left view, right view and/or blank 3D frames. For example, the 3D video display device 330 may record a time instant when a positive rising edge of a generated signal may indicate that a left view 3D frame is being refreshed on the 3D video display device 330. The 3D video display device 330 may communicate the recorded time instant to the 3D viewing shutter device 300.

The 3D video display device 330 may comprise suitable logic, circuitry, interfaces and/or code that may be operable to determine a response time for illumination of pixels that corresponds to video data written to the display device. For example, the response time may correspond to the time that it may take for a pixel to change from illumination based on data from one frame of video data to illumination based on another frame of video data. In this regard, the response time may depend on the type of display technology utilized and/or on a particular display device. Furthermore, the response time may depend on the difference in pixel illumination levels, for example, luminance levels, gray levels or color levels, for example, between different video frames. For example, response time may be greater for a pixel to change from black to white than to change from a middle level gray to white.

In various embodiments of the invention, the 3D video display device 330 may be operable to communicate to the 3D viewing shutter device 300, a single response time, for example, an average response time, for a particular display and/or for a type of display. In another exemplary embodiment of the invention, the 3D video display device 330 may be operable to communicate to the 3D viewing shutter device 300, response times that correspond to one or more frames of video data that are written to the display. For example, the 3D video display device 330 may communicate response times to the 3D viewing shutter device 300 when one or more frames comprising a low level illumination is followed by one or more frames of high level illumination. Furthermore, any other characteristic of pixel illumination that may persist and may affect response time may be utilized to determine the display response time.

The 3D viewing shutter device 300 may comprise suitable logic, circuitry, interfaces and/or code that may be operable to synchronize opening and closing of left and right shutters with a refresh rate of a display screen, for example, of the 3D video display device 330. The 3D viewing shutter device 300 may be utilized when viewing 3D video and/or graphics frames on the 3D video display device 330 to create an illusion of viewing a three dimensional image. The 3D viewing shutter device 300 may comprise 3D shutter eyewear and may be referred to as the 3D shutter eyewear 300, however, the invention is not limited in this regard and any suitable form factor for the 3D viewing shutter device 300 may be utilized. In addition to eyewear, exemplary form factors for the 3D viewing shutter device 300 may comprise goggles, a hat, a visor, a helmet, binoculars and/or a handheld device. In an exemplary pair of 3D shutter eyewear 300, the shutter 310 that may correspond to a left eye may block light from reaching the left eye while the shutter 312 corresponding to a right eye may enable transmission of light to the right eye and vice versa. The left and right shutters 310 and 312 may be operable to close simultaneously.

The 3D viewing shutter device 300 may be operable to communicate with the 3D video display device 330 to maintain clock synchronization. For example, the 3D viewing shutter device 300 may be operable to maintain a clock that is phase locked to a clock in the 3D video display device 330. For example, Bluetooth clocks may be utilized; however, the invention is not limited in this regard. The 3D viewing shutter device 300 may be operable to receive the one or more response times for the 3D video display device 330. The 3D viewing shutter device 300 may utilize the clock to control the left and right shutters 310 and 312 and to maintain synchronization with display of left and right 3D frames by the 3D video display device 330. The 3D viewing shutter device 300 may utilize the response times received from the 3D video display device 330 to control the duration of transmittance in the left and right shutters 310 and 312.

The shutter controller 320 in the 3D viewing shutter device 300 may comprise suitable logic, circuitry, interfaces, and/or code that may be operable to control opening and/or closing of the left and right shutters 310 and 312 based on the received response time and/or clock signals from the video display device 330. The shutter controller 320 may also utilize a response time for transitioning the left and/or right shutters 310 and 312 between transmittance and blocking light in order to determine when to open and/or when to close the left and right shutters 310 and 312. In this regard, shutter control signals may be generated by the shutter controller 330 and may be communicated to the left and right shutters 310 and 312. In an exemplary embodiment of the invention, the shutters 310 and 312 may comprise LCD shutters and/or non-LCD shutters, that may close and block light to a specified eye, when an appropriate voltage level from the shutter controller 320 is applied. Accurate synchronization of the left and right shutters 310 and 312 with the displayed 3D right frame 332 and the displayed 3D left frame 334 may be necessary to avoid bothersome or less than desirable cross talk or flicker effects.

In operation, the 3D video display device 330 may generate left and right 3D video frames for display, such as, the displayed 3D right frame 332 and the displayed 3D left frame 334. A viewer may wear the 3D shutter eyewear 300 that may be synchronized with the 3D video display device 330 when viewing the 3D video frames. The shutter controller 320 may close both shutters 310 and 312 simultaneously and/or may delay opening of a shutter, for example, at times when cross talk or other unwanted visual effects may impair perceived image quality. In this regard, the 3D video display device 330 may communicate clock signals and/or display 330 response times to the 3D shutter eyewear 300. At time instant 350A, the 3D video display device 330 may refresh its screen with the displayed 3D right frame 332. While the displayed 3D right frame 332 is illuminated, the shutter controller 320 in the 3D eyewear 300 may determine shutter transmittance and/or blocking times and durations based on clock signals and may adjust times and durations based on the display device 330 response time and/or based on response time of the shutter eyewear 300. The shutter controller 320 may enable viewing by the viewer's right eye via the right shutter 312 and may block light to a viewer's left eye with the left shutter 310 at appropriate times. At time instant 350B, the 3D video display device 330 may refresh its screen with the displayed 3D left frame 334. While the displayed 3D left frame 334 is illuminated, the shutter controller 320 may adjust for response time in the display device 330 and/or in the shutter eyewear 300 and may enable viewing by the viewer's left eye via the left shutter 310 and may block light to the viewer's right eye with the right shutter. In various embodiments of the invention, one or more blank frames may be displayed in between illumination of the displayed 3D right frame 332 and the displayed 3D left frame 334 to further enhance cross talk mitigation, for example.

Figure 3B:
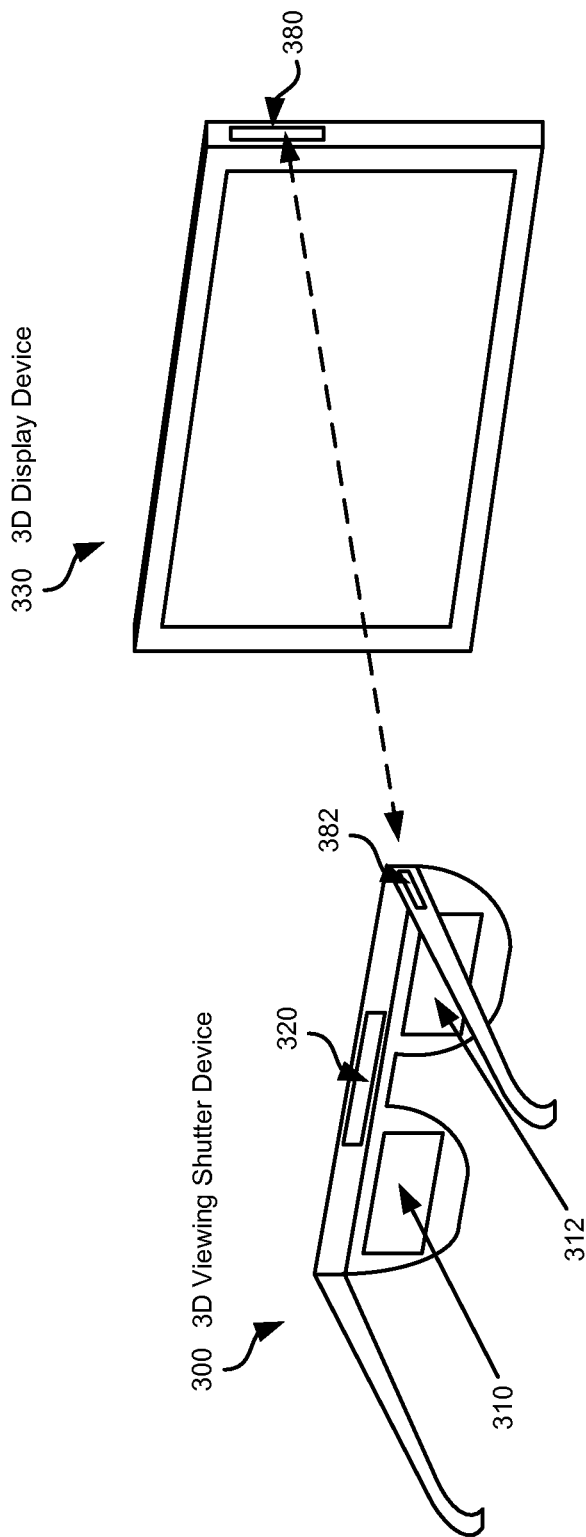
FIG. 3B is a diagram that illustrates an exemplary wireless communication link between a 3D viewing shutter device and a 3D video display device, in accordance with an embodiment of the invention.

FIG. 3B is a diagram that illustrates an exemplary wireless communication link between a 3D viewing shutter device and a 3D video display device, in accordance with an embodiment of the invention. Referring to FIG. 3, there is shown the 3D video display device 330 that may comprise a first wireless device 380. Also shown is the 3D viewing shutter device 300 that may comprise the left shutter 310, the right shutter 312, the shutter controller 320 and a second wireless device 382. The 3D viewing shutter device 300 may be referred to as the 3D shutter eyewear 300.

The 3D video display device 330 and the 3D shutter eyewear 300 which are described with respect to FIG. 3A, may be operable to communicate via a wireless link between the first wireless device 380 and the second wireless device 382. The wireless link may be utilized to communicate information that enables synchronization of the 3D shutter eyewear 300 with the 3D video display device 330. For example, clock signals, information regarding display of left, right and/or blank frames and/or display response time as described with respect to FIGS. 1A, 1B, 2A, 2B, 2C and 3A, may be communicated to the 3D shutter eyewear 300 from the 3D video display device 330.

The first wireless device 380 may be integrated or coupled to the 3D video display device 330 and the second wireless device 382 may integrated and/or coupled to the 3D shutter eyewear 300. In instances when a projector is used to display 3D images on a screen, the first wireless device 380 may be integrated within the projector. A wireless connection may be established between the first wireless device 380 and the second wireless device 382 for viewing left and right 3D video frames through the 3D shutter eyewear 300. In an exemplary embodiment of the invention, when the first wireless device 380 and the second wireless device 382 are both Bluetooth devices, the first wireless device 380 may operate a Bluetooth master clock and the second wireless device 382 may operate a Bluetooth slave clock to facilitate communication between the two devices.

In various embodiments of the invention, the second wireless device 382 may be integrated within the shutter controller 320 in the 3D shutter eyewear 300. While FIG. 3 shows the second wireless device 382 as being disposed on one side of the 3D shutter eyewear 300, this is merely for illustrative purposes. The second wireless device 382 may be placed on, integrated within and/or connected to any portion of the 3D eyewear 300 that may enable wireless communication with the first wireless device 380.

Wireless technology that may be utilized to communicate information between the video display device 330 and the 3D viewing shutter device 300 may include, but need not be limited to, personal area network (PAN) technologies such as Bluetooth, Ultra-Wideband (UWB), Z-Wave, and ZigBee, for example. Technologies that support wireless communication over the Industrial, Scientific, and Medical (ISM) 3.4 GHz radio frequency bandwidth may also be used. Similarly, technologies that support wireless communication over 900 MHz, 1.9 GHz, and 5.8 GHz, such as those technologies used in cordless phone applications, for example, may also be used to synchronize the shutter controller 320 to the image generation process in the 3D video display device 330. In various embodiments of the invention, technologies for use in wireless local area network (WLAN) applications, such as WiFi or those based on IEEE 803.11 standards, for example, may also be used to synchronize the shutter controller 320 to the image generation process in the 3D video display device 330.

In operation, the 3D video display device 330 may display 3D video and/or graphics content comprising sequential left and right view frames and/or blank frames, for example. A viewer may utilize the 3D shutter eyewear 300 to view the sequential left and right frames. In various embodiments of the invention, the 3D shutter eyewear and the 3D video display device 330 may establish a wireless connection via the first and second wireless devices 380 and 382 in order to synchronize operation of the shutters 310 and 312 with display of 3D left and right frames by the 3D video display device 330. The first wireless device 380 and the second wireless device 382 may be operable to communicate information that enables clock synchronization, and/or information about when a left, a right and/or a blank frame or sequence of frames may be displayed on the 3D video display device 330. In addition the first and second wireless devices 380 and 382 may be operable to communicate display refresh rates and/or an interval or period of time over which a pattern of left, right and/or blank frames may be displayed.

The first and second wireless devices 380 and 382 may also be operable to communicate a time offset and/or a time delay for opening and/or closing shutters in the 3D shutter eyewear 300. The first and second wireless devices 380 and 382 may also be operable to communicate information regarding display response time of the 3D video display device 330. The first wireless device 380 may be operable to similarly communicate with a plurality of 3D shutter eyewear. In other exemplary embodiments of the invention, the first wireless device 380 in the 3D video display device 330 may broadcast shutter sync information for reception by one or more viewing devices such as the 3D shutter eyewear 300 that may be located within communication range. In various embodiments of the invention, the first and second wireless devices 380 and 382 may be operable to perform two way communications via the wireless connection. In other embodiments of the invention, the 3D shutter eyewear 300 may be operable to receive communication from the 3D video display device 330 but may not transmit information to the display device 330.

Figure 4:
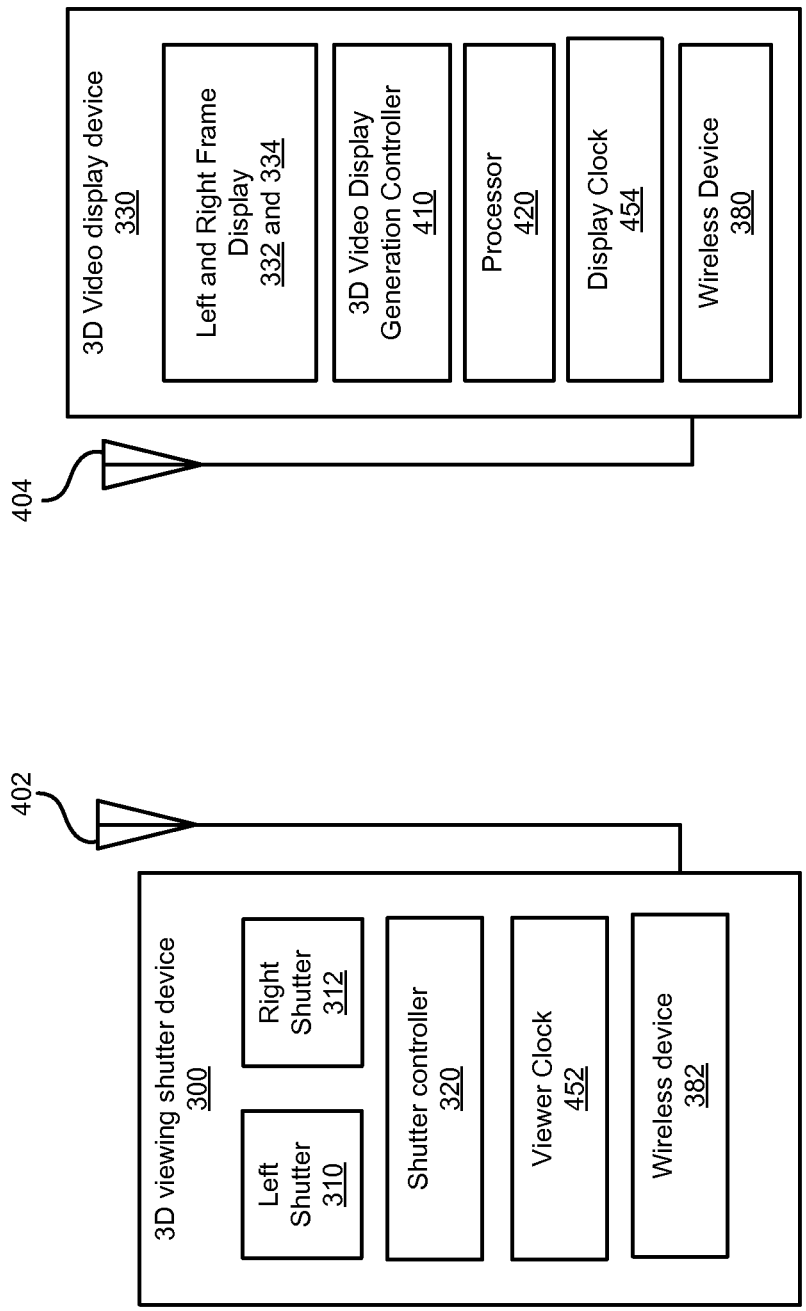
FIG. 4 is block a diagram that illustrates an exemplary 3D viewing shutter device that is operable to determine when to open and close left and right shutters based on 3D video display response time, in accordance with embodiments of the invention.

FIG. 4 is block a diagram that illustrates an exemplary 3D viewing shutter device that is operable to determine when to open and close left and right shutters based on 3D video display response time, in accordance with embodiments of the invention. Referring to FIG. 4, there is shown the 3D video display device 330 and the 3D viewing shutter device 300. The 3D video display device 330 may comprise the displayed 3D right frame 332 and the displayed 3D left frame 334, a 3D video generation controller 410, a processor 420, a display clock 454, the first wireless device 380 and an antenna 404. The 3D viewing device 300 may comprise the shutter controller 320, a viewer clock 452, the second wireless device 382 and an antenna 402. The 3D viewing device 300 may be referred to as the 3D shutter eyewear 300.

Aspects of the video display device 330, the displayed 3D right frame 332, the displayed 3D left frame 334, the 3D viewing device 300, the shutter controller 320, the left shutter 310, the right shutter 312 and the first and second wireless devices 380 and 382 are described with respect to, for example, FIG. 1A, FIG. 1B, FIG. 2A, FIG. 2B, FIG. 2C, FIGS. 3A and 3B.

The antennas 402 and 404 may comprise suitable logic, circuitry, interfaces and/or code that may be operable to transmit and/or receive signals among the 3D viewing device 300 and the 3D display device 330. For example, the antennas 402 and/or 404 may be operable to handle frequency bands that may be utilized for communication based on the wireless technologies described with respect to FIG. 3, such as for example, Bluetooth communication. The antennas 402 and 404 may be located internally and/or externally with respect to the 3D viewing device 300 and the 3D video display device 330 respectively.

In an exemplary embodiment of the invention, the 3D video display device 330 and the 3D viewing device 300 may be operable to communicate based on Bluetooth communication standards, however, the invention is not limited in this regard and any suitable standard or non-standardized wireless technology may be utilized. The video display device 330 may comprise suitable logic, circuitry, interfaces and/or code that may be operable to maintain the display clock 454. The display clock 454 may comprise a counter, for example, a counter utilized in a Bluetooth master clock. The 3D viewing device 300 may comprise the viewer clock 452 which may be synchronized based on reference signals from the display clock 454 or vice versa. The viewer clock 452 may be utilized as a reference clock for controlling opening and closing of the left and right shutters 310 and 312. In various embodiments of the invention, the viewer clock 452 may be phase locked to the display clock 454. For example, the phase of the viewer clock 452 may be updated when packets sent by the 3D video display device 330 via the wireless first device 380 and the antenna 404 are received by the 3D shutter eyewear 300 via the antenna 402 and the second wireless device 382. In this manner, the phase of the viewer clock may be accurate within a few microseconds, for example. In various embodiments of the invention, the display clock 454 and the viewer clock 452 may comprise master and slave Bluetooth clocks. In various embodiments of the invention, one or both of the display clock 454 and the viewer clock 452 may be synchronized with a third clock, for example, a GPS clock or a clock signal from a network device.

The 3D video generation controller 410 may comprise suitable logic, circuitry, interfaces and or code that may be operable to generate a sequence of 3D left, right and/or blank frames that are displayed on the 3D video display device 330. For example, the 3D video generation controller 410 may be operable to generate the displayed 3D right and left frames 332 and 334. Moreover, the 3D video generation 410 may be operable to generate a pattern of frames, such as for example, the pattern of frames comprising the left view frame 104, the blank frame 106, the right view frame 108 and the blank frame 110 and/or, for example, the left frame 100 and the right frame 102. In addition, the 3D video generation controller 410 may be operable generate a display signal that may indicate when the 3D left, right and/or blank frames are displayed. A display signal is described with respect to FIGS. 3A and 3B. For example, the 3D video generation controller may generate a square wave that may be positive when a left frame is displayed and may be negative when a right frame is displayed. Notwithstanding, the invention is not limited in this regard, and any suitable signal may be utilized. Furthermore, the 3D video generation controller 410 may comprise suitable logic, circuitry, interfaces and/or code that may be operable to determine a display response time for the 3D video display device 330. In various embodiments of the invention, the 3D video generation controller 410 may be operable to determine a display response time for one or more frames to be displayed such as the displayed 3D right frame 332 and the displayed 3D left frame 334.

The processor 430 may comprise suitable logic, circuitry, interfaces and/or code that may be operable to determine and/or communicate the display response time for the 3D video display device 330 to the 3D shutter eyewear 300. Furthermore the processor 430 may be operable to determine and/or communicate the display response time for one or more frames to be displayed, such as the displayed 3D right frame 332 and the displayed 3D left frame 334 to the 3D shutter eyewear 300.

The processor 430 may comprise suitable logic, circuitry, interfaces and/or code that may be operable to record a time instant from the display clock 454 when the display device 330 is refreshed with a new 3D left or right frame or at the beginning of a pattern or sequence of left, right and/or blank frames. For example, the processor 430 may record a time instant that is associated with a rising edge of a display refresh signal which may comprise a square wave. The rising edge may indicate that, for example, a left frame from the beginning of a pattern of left, right and/or blank frames is being refreshed on the 3D video display device 330. Alternatively, a vertical or horizontal sync pulse that may be generated at the beginning of a frame when a frame is written to a display, may be utilized to associate a display clock time instant with left, right or blank frame display refresh, for example. The processor 430 may be operable to communicate the recorded time instant to the 3D viewing shutter device 300. In addition, the processor 430 may be operable to communicate a time interval over which a corresponding pattern of left, right and/or blank frames is displayed on the 3D viewing device 300, via the first wireless device 380 and the antenna 404. In instances when, for example, the pattern of left, right and/or blank frames changes, the interval over which a pattern occurs changes, or for example, a left, right refresh rate changes, the processor 430 may communicate new information that corresponds to the changes to the 3D shutter eyewear 300. These types of changes may occur when a channel is changed, for example.

In various embodiments of the invention, the processor 430 may be operable to determine a time offset for opening and/or closing left and right shutters, for example, to avoid left, right image crosstalk or other undesirable visual effects. The time offset may be dependent on the type of display utilized in the 3D video display device 330. For example, a persistent LCD display may cause the crosstalk as described with respect to FIGS. 1A, 1B, 2A, 2B, 2C, 3A and FIG. 3B. In this regard, the 3D video display device 330 may be operable to communicate the time offset to the 3D shutter eyewear 300 via the first wireless device 380 and the antenna 404.

The wireless device 382 in the 3D shutter eyewear 300 may be operable to receive the timing information and the response time information from the 3D video display device 330. The shutter controller 320 may be operable to utilize the received information to determine when to open and close the left and right shutters 310 and 312.

In operation, the video generation controller 410 may write left, right and/or blank frames to be displayed on the 3D video display device 330 and may generate a corresponding display refresh signal that may indicate when the left, right and/or blank frames are refreshed and/or sustained on the display. The processor 430 may receive the display refresh signals and may detect when a pattern of left, right and/or blank frames may be generated.

The video generation controller 410 and/or the processor 430 may be operable to determine a response time for pixel illumination in the 3D video display device 330 based on a difference in gray levels or other characteristics between the left, right and/or blank frames, for example, between two or more video frames, such as the 3D right frame 332 and the 3D left frame 334 and/or between two or more sequences of 3D video frames. In various embodiments of the invention, the video processor 430 may be operable to determine a response time or an average response time based on the type of display technology utilized in the 3D video display device 330. For example, a response time may be measured and/or configured in the display device.

The processor 430 may be operable to communicate to the 3D shutter eyewear 300, one or more of clock reference signals, left, right and/or blank frame patterns, refresh rates for left, right and/or blank frames and information corresponding to display response times via the first wireless device 380 and the antenna 404. Display response times may be communicated prior to communicating a 3D video sequence and/or during display of the video sequence. For example, in instances when display response times may depend on gray levels in video data, display response time may be communicated for each displayed frame and/or for a plurality of frames. In instances when the communicated display response times depend on display technology and/or a particular display, for example, the response time may be communicated once, for example, during initialization of the 3D shutter eyewear 300.

The 3D shutter eyewear 300 may be operable to receive from the 3D display device 330, one or more of clock reference signals, left, right and/or blank frame patterns, refresh rates for left, right and/or blank frames and information corresponding to display response times via the second wireless device 382 and the antenna 402. The shutter controller 330 may be operable to determine when to open and close the left and right shutters 310 and 312 based on the received information, the viewer clock 452 and/or the response time of the left and/or right shutters 310 and 312, respectively. The shutter controller 320 may be operable to generate left and/or right shutter control signals that may open and close the left and right shutters 310 and 312 respectively, at suitably precise time instants to avoid enabling a perception of crosstalk by a viewer due to display response time.

In a similar manner, the 3D video display device 330 may be operable to communicate and/or enable synchronization with a plurality of 3D shutter eyewear for controlling left and right shutters in the plurality of 3D shutter eyewear.

Figure 5:
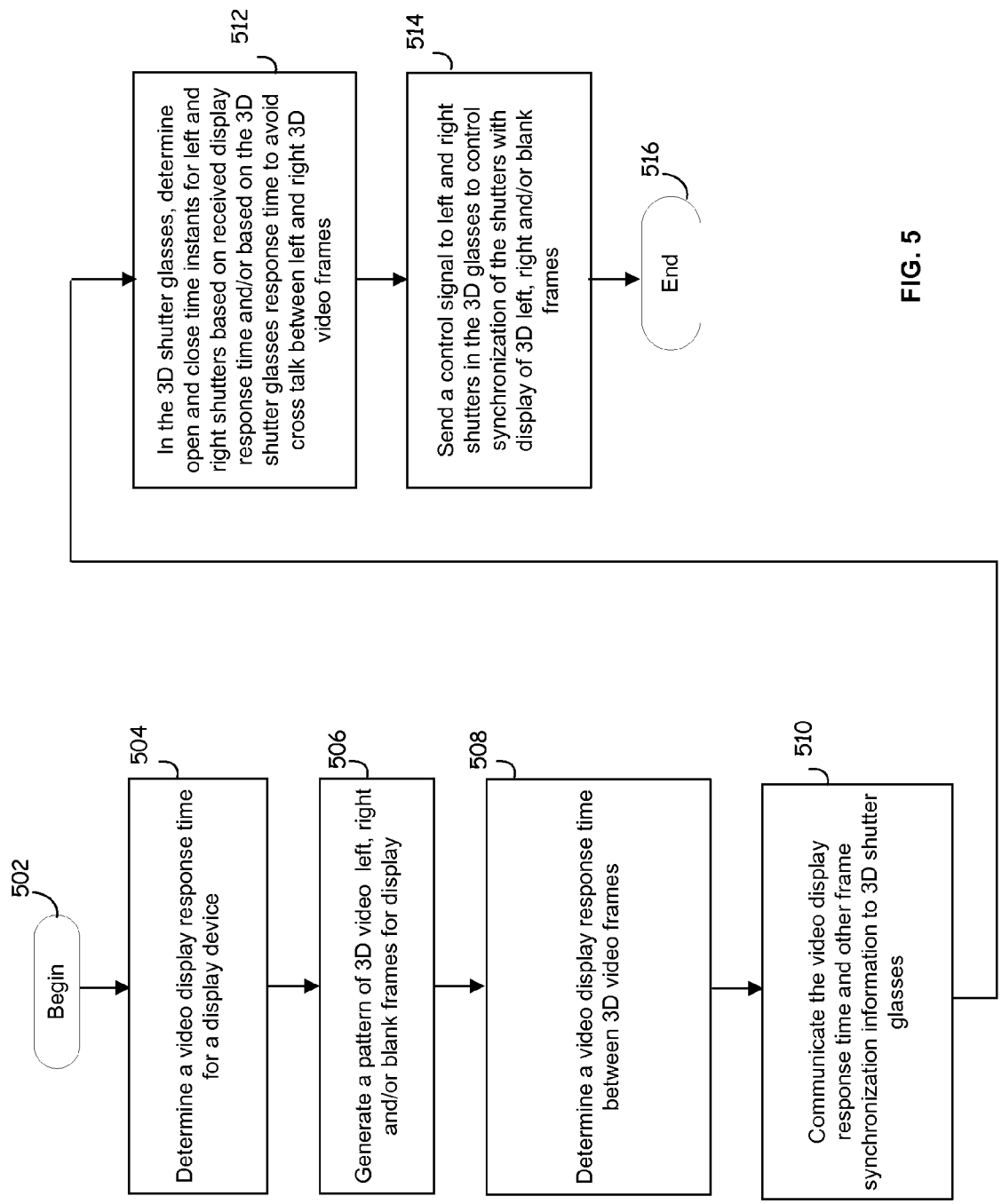
FIG. 5 is a flow chart illustrating exemplary steps for determining transmittance intervals in 3D shutter eyewear based on display panel response time, in accordance with an embodiment of the invention.

FIG. 5 is a flow chart illustrating exemplary steps for determining transmittance intervals in 3D shutter eyewear based on display panel response time, in accordance with an embodiment of the invention. Referring to FIG. 5, the exemplary steps may begin at step 503. In step 504, the video display device 330, may determine a video display response time for its display. In step 506, the 3D video display device 330 may generate a pattern of 3D video left, right and/or blank frames for display. In step 508, in various embodiments of the invention, the 3D video display device 330 may determine a video display response time between 3D video frames based on gray levels and/or other pixel characteristics which might affect display response time. In step 510, the video display device 330 may communicate the video display response time information and/or other frame synchronization information to the 3D shutter eyewear 300. In step 512, the 3D shutter eyewear 300 may determine open and close time instants for left and right shutters based on the display response time information received from the video display device 330. The 3D shutter eyewear 300 may also utilize 3D shutter eyewear response time to determine left and right opening and/or closing time instants, for example, to avoid cross talk between left and right 3D video frames. In step 514, the shutter controller 320 may send control signals to left and right shutters in the 3D eyewear 300 to control synchronization of the shutters with display of 3D left, right and/or blank frames. The exemplary steps may end at step 516.

In an embodiment of the invention, a 3D video viewing shutter device 300 that is communicatively coupled to a 3D video display device 330 may receive information from the 3D video display device 330 that is based on the response time line 212 for display of 3D frames by the 3D video display device 330. The 3D video viewing shutter device 300 may determine time instants that correspond to, when to open and when to close, left and right shutters 310 and 312, based on the received response time line 212 information. The 3D video viewing shutter device 300 may open and close left and right shutters 310 and 312 based on the determined time instants. The received response time line 212 information may be based on a response time for a type of display utilized in the 3D video display device 330. Moreover, the received response time line 212 information may be based on a response time for a particular display utilized in the 3D video display device 330. In various embodiments of the invention, the received response time line 212 information may be based on a response time for a change in pixel illumination levels between display of two video frames, for example, the left frame 104 and the right frame 108 and/or between display of video frame sequences. The 3D video viewing shutter device 300 may receive the information from the 3D video display device 330 that is based on the response time line 212, for initialization of the 3D video viewing shutter device 300. The 3D video viewing shutter device 300 may receive the information when one or more frames comprising a lower level of pixel illumination is followed by one or more frames comprising a higher level of pixel illumination. Furthermore, the 3D video viewing shutter device 300 may receive the information when one or more frames comprising a higher level of pixel illumination is followed by one or more frames comprising a lower level of pixel illumination.

The 3D frames 150B, for example, may comprise a pattern of left, right and one or more blank frames. The 3D video viewing shutter device 300 may extend a left shutter 310 transmittance time, for example, the left open shutter time 214, from a display time for a left frame into display time of one or more subsequent blank frames. Similarly, the 3D video viewing shutter device 300 may extend a right shutter transmittance time, for example, the right shutter open time 216, from a display time of a right frame into a display time of one or more blank frames. The extension of shutter transmittance time 214 and/or 216, may be based on one or both of the response time line 212 for display of 3D frames by the 3D video display device 330 and a response time associated with said 3D video viewing shutter device 300.

The 3D video viewing shutter device 300 may enable transmittance by a left shutter 310 during display time of one or more blank frames that is subsequent to display time of a left 3D frame. The 3D video viewing shutter device 300 may enable transmittance of a right shutter 312 during display time of one or more blank frames that is subsequent to display time of a right 3D frame. The enabled transmittance may be based on one or both of the response time line 212 for display of 3D frames by the 3D video display device 330 and a response time associated with the 3D video viewing shutter device 300. The 3D video viewing shutter device 300 may communicate with the 3D video display device 330 via a wireless link as shown in FIG. 3B. For example, the 3D video viewing shutter device 300 may communicate with the 3D video display device 330 via a Bluetooth wireless link utilizing Bluetooth clocks. In this manner, transmittance intervals, for example, left open 214 and right open 216, in 3D shutter eyewear 300 may be determined based on display panel response time line 212.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for transmittance intervals in 3D shutter eyewear based on display panel response time.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a 3D video viewing shutter device that is communicatively coupled to a 3D video display device:
receiving display response time information from said 3D video display device for display of 3D frames by said 3D video display device;
determining time instants that correspond to when to open and when to close a left shutter or a right shutter of said 3D video viewing shutter device, using said received display response time information, wherein a transmittance interval of a left shutter or a right shutter is dynamically adjusted based on said received display response time information and extends across frames based on display response; and
opening or closing said left shutter or said right shutter of said 3D video viewing shutter device using said determined time instants.

2. The method according to claim 1, wherein said received display response time information is for a type of display utilized in said 3D video display device.

3. The method according to claim 1, wherein said received display response time information is for a particular display utilized in said 3D video display device.

4. The method according to claim 1, wherein said received display response time information includes or is derived from a response time for a change in pixel illumination levels between display of two or more video frames as measured by the 3D video display device.

5. The method according to claim 1, comprising receiving said display response time information, for one or more events comprising:
initialization of said 3D video viewing shutter device:
when one or more frames comprising a lower level of pixel illumination is followed by one or more frames comprising a higher level of pixel illumination; or
when one or more frames comprising a higher level of pixel illumination is followed by one or more frames comprising a lower level of pixel illumination.

6. The method according to claim 1, wherein said 3D frames comprise a pattern comprising two or more of:
left frames;
right frames;
blank frames; and
frames comprising a combination of left and right frame data.

7. The method according to claim 1, comprising extending a left shutter transmittance time from display time of a left frame into display time of one or more subsequent blank frames or extending a right shutter transmittance time from display time of a right frame into display time of one or more blank frames, based at least in part on one or both of:
said display response time information; and
a response time associated with said 3D video viewing shutter device.

8. The method according to claim 1, comprising enabling transmittance of a left shutter during display time of one or more blank frames that is subsequent to display time of a left 3D frame or enabling transmittance of a right shutter during display time of one or more blank frames that is subsequent to display time of a right 3D frame based at least in part on one or both of:
said display response time information; and
a response time associated with said 3D video viewing shutter device.

9. A system for communication, the system comprising:
one or more processors, one or more circuits, or any combination thereof for use in a 3D video viewing shutter device, said 3D video viewing shutter device being communicatively coupled to a 3D video display device during operation, wherein said one or more processors, one or more circuits, or any combination thereof are operable to:
receive display response time information from said 3D video display device for display of 3D frames by said 3D video display device;
determine time instants that correspond to when to open and when to close a left shutter or a right shutter of said 3D video viewing shutter device,
use said received display response time information wherein a transmittance interval of a left shutter or a right shutter is dynamically adjusted based on said received display response time information and extends across frames based on display response;

and open or close said left shutter or said right shutter of said 3D video viewing shutter device using said determined time instants.

10. The system according to claim 9, wherein said received display response time information is for a type of display utilized in said 3D video display device.

11. The system according to claim 9, wherein said received display response time information is for a particular display utilized in said 3D video display device.

12. The system according to claim 9, wherein said received display response time information includes or is derived from a response time for a change in pixel illumination levels between display of two or more video frames as measured by the 3D video display device.

13. The system according to claim 9, wherein said one or more processors, one or more circuits, or any combination thereof is operable to receive said display response time information, for one or more events comprising:
    initialization of said 3D video viewing shutter device when one or more frames comprising a lower level of pixel illumination is followed by one or more frames comprising a higher level of pixel illumination; or
    when one or more frames comprising a higher level of pixel illumination is followed by one or more frames comprising a lower level of pixel illumination.

14. The system according to claim 9, wherein said 3D frames comprise a pattern comprising two or more of:
    left frames;
    right frames;
    blank frames; and
    frames comprising a combination of left and right frame data.

15. The system according to claim 9, wherein said one or more processors, one or more circuits, or any combination thereof is operable to extend a left shutter transmittance time from display time of a left frame into display time of one or more subsequent blank frames or extending a right shutter transmittance time from display time of a right frame into display time of one or more blank frames, based at least in part on one or both of:
    said display response time information; and
    a response time associated with said 3D video viewing shutter device.

16. The system according to claim 9, wherein said one or more processors, one or more circuits, or any combination thereof is operable to enable transmittance of a left shutter during display time of one or more blank frames that is subsequent to display time of a left 3D frame or enabling transmittance of a right shutter during display time of one or more blank frames that is subsequent to display time of a right 3D frame based at least in part on one or both of:
    said display response time information; and
    a response time associated with said 3D video viewing shutter device.

17. The system according to claim 9, wherein said one or more processors, one or more circuits, or any combination thereof is operable to communicate with said 3D video display device via a wireless link.

18. The system according to claim 9, wherein said one or more processors, one or more circuits, or any combination thereof is operable to communicate with said 3D video display device via a Bluetooth wireless link utilizing Bluetooth clocks.

19. A method for communication, the method comprising: in a 3D video viewing shutter device that is communicatively coupled to a 3D video display device:
    receiving from said 3D video display device a display response time of said 3D video display device;
    determining, using said display response time, at least one time instant that corresponds to when to open or close a shutter of said 3D video viewing shutter device wherein a transmittance interval of a left shutter or a right shutter is dynamically adjusted based on said received display response time information and extends across frames based on display response;
    and opening or closing said shutter in accordance with said at least one time instant.

20. The method of claim 19, wherein said display response time comprises at least one of a time for a left frame to illuminate said 3D video display device, a time for a right frame to illuminate said 3D video display device, or a time for a black frame to reach a saturation level on said 3D video display device.

* * * * *